May 3, 1960  W. HANCOCK  2,934,832
DRYING APPARATUS FOR CLAY CAKES SUCH AS ARE USED IN
THE MANUFACTURE OF TILES
Filed March 7, 1958  2 Sheets-Sheet 1

May 3, 1960   W. HANCOCK   2,934,832
DRYING APPARATUS FOR CLAY CAKES SUCH AS ARE USED IN
THE MANUFACTURE OF TILES
Filed March 7, 1958   2 Sheets-Sheet 2
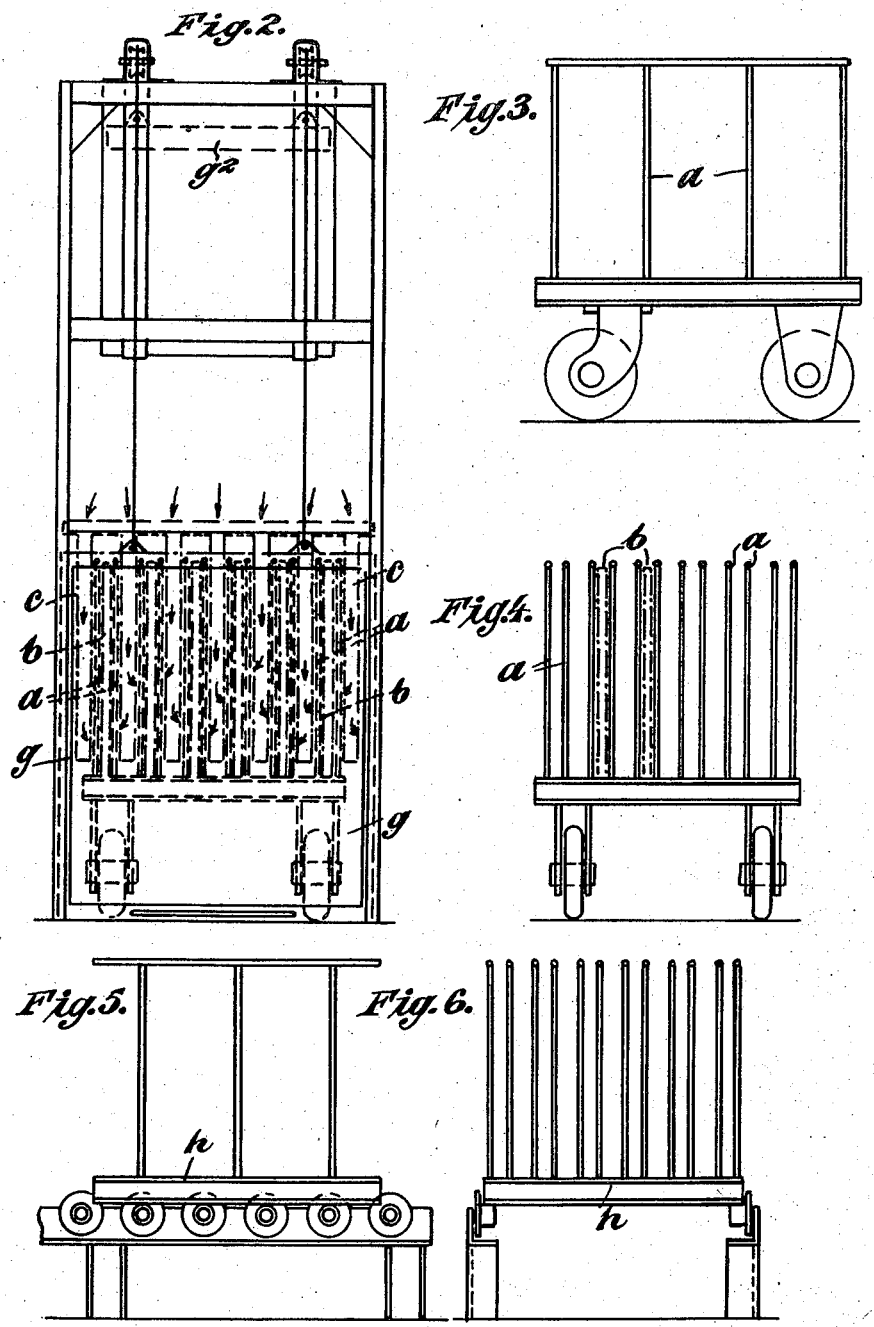

2,934,832

DRYING APPARATUS FOR CLAY CAKES SUCH AS ARE USED IN THE MANUFACTURE OF TILES

William Hancock, Stoke on Trent, England

Application March 7, 1958, Serial No. 719,947

2 Claims. (Cl. 34—225)

The present invention has relation to apparatus for drying clay cakes after they leave the filter press and which may be used in the manufacture of tiles.

Clay cakes when received from a clay filter press are normally approximately 2' 10" square and 1¼" thick and contain about 30% water and 70% clay.

The present invention has for its object to control the drying of such filter pressed clay cakes to uniform moisture content and distribution by the use of the high velocity hot air jets in a particularly simple and efficient manner so that they shall be particularly suited for the tile and other like industries.

According to the present invention there is provided a rack comprising vertical frames between which the flat cakes are placed in vertical manner and interposed between each cake carrying rack is a vertically disposed box extending substantially the vertical dimension of the rack, said box having perforations through which the hot air is delivered laterally onto the cakes.

Conveniently upright frames are mounted in pairs upon a wheeled or traversable truck and this truck is adapted to enter a housing having a plurality of depending perforated boxes which come between the respective cake carrying racks for delivery of hot air, the said boxes being fed with hot air from an upper compartment with which they are in open connection by means of a motor driven fan with heater, the circuit being downwardly, inwardly with return or partial upward return.

In order that the invention may be clearly understood and readily carried into practice, reference may be had to the accompanying drawings, in which:

Fig. 2 is an end elevation.

Figs. 3 and 4 are side and end elevations respectively of a wheled truck and

Figure 1:
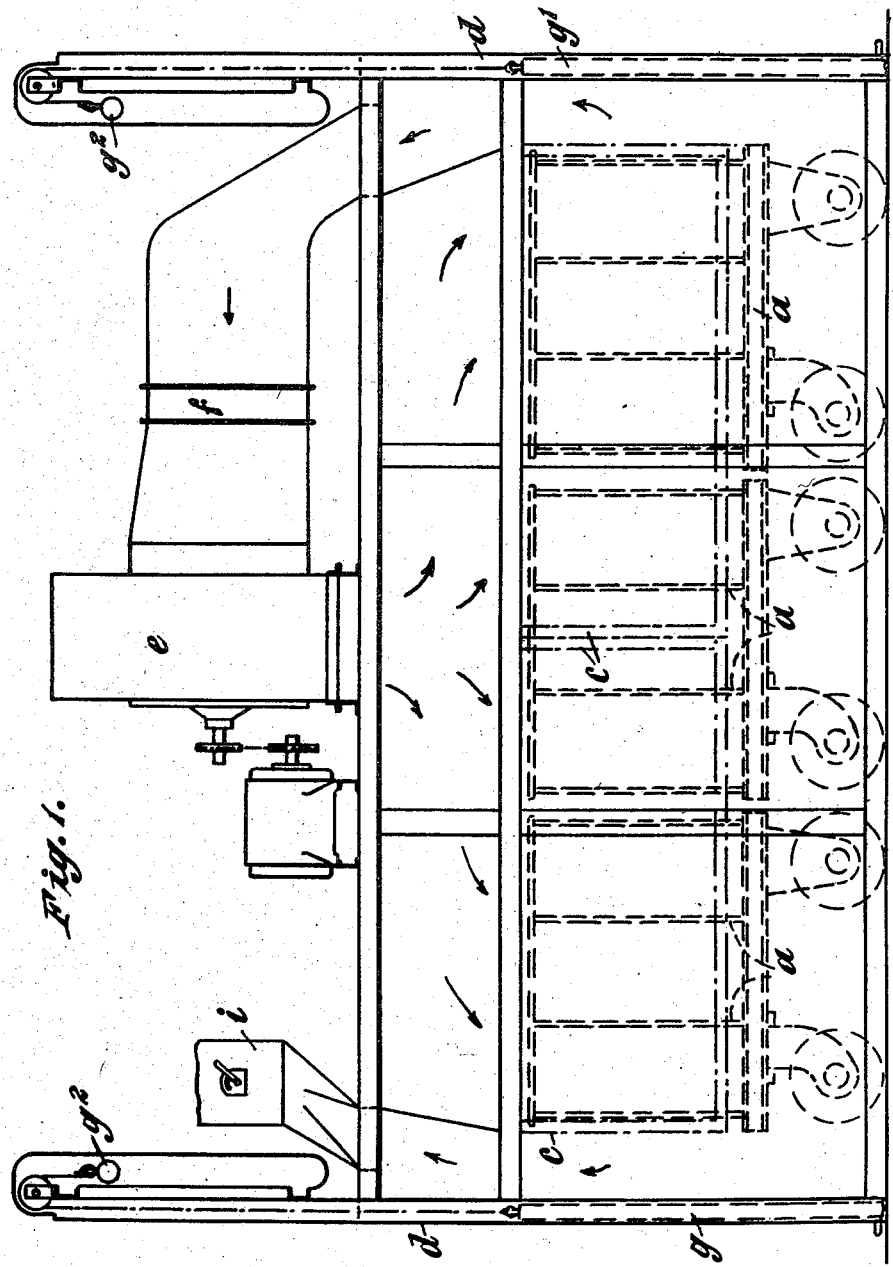
Fig. 1 illustrates in side elevation a housing with three trucks in position.

Figs. 5 and 6 corresponding views of a truck for use upon a stationary roller track.

In a convenient embodiment of the present invention there is provided a wheeled truck (Figs. 3 and 4) having, for example, six vertical upright frames $a$ arranged in pairs as shown between which the cakes $b$ are placed after the manner of a toast rack. Each pair of frames $a$ containing a clay cake $b$ is spaced from its neighbour to accommodate a vertical depending air box $c$ which is perforated on its faces and these air boxes $c$ are open at their upper extremities and are suspended from an upper part of a housing $d$ wherein the wheeled truck is adapted to be accommodated. The truck can be wheeled into the housing so that the fixed air boxes $c$ come between the pairs of frames $a$ supporting the clay cakes $b$ (see Fig. 2). The upper part of the housing $d$ is enclosed and provided on top of the housing is the circulatory mechanism for pottery drying purposes, that is to say, a motor driven fan $e$, the fan directing the hot air downwardly into the upper part of the housing (see arrows Fig. 1) so that it passes through the air boxes $c$ on to the faces of the cakes of clay the return or partial return of the hot air being as, for example, at the rear of the housing upwardly towards the fan where it is reheated at $f$. The housing may have a length suitable for accommodating a plurality of cake laden trucks one after the other (three are shown) and the front and rear of the housing may be provided with a slidable door $g$, $g^1$ controlled by an upwardly directed chain and balance weight $g^2$. $i$ is an air valve or damper for regulating the temperature and flow of air in the housing.

The pressed clay cakes are dropped vertically on to the clay trucks for conveyance to the drying unit each truck conveniently accommodating six cakes and the trucks (toast rack type) are wheeled into the drying unit or housing, fitting in between the vertical air boxes $c$ having the air orifices or jets perforated on the vertical faces of the air shelves. The warm or hot air is distributed over the entire vertical surfaces of the clay cakes as they stand on the trucks, thus giving uniform volume and velocity of air to the cake, which gives complete controlled moisture content and distribution.

In that embodiment shown in Figs. 5 and 6 the rack $h$ with frames in pairs to hold the clay cakes is mounted upon a stationary roller track which is led into the housing $d$.

I claim:

1. Drying apparatus for clay cakes, comprising, in combination, a housing, partitioning means located within said housing and dividing the interior of said housng into a chamber occupying the upper part of said housing and a tunnel occupying the lower part of said housing, said partitioning means constituting the ceiling of said tunnel, doors at the ends of said tunnel, said doors being adapted to be opened to admit trucks into said tunnel, and to permit trucks to move out of said tunnel, said doors being adapted to be closed to prevent the free entrance of ambient air into said tunnel and to prevent the free escape of processing air through said doors, a plurality of laterally spaced relatively thin boxes depending from the ceiling of said tunnel, there being openings from said chamber into said boxes, the vertical sides of said boxes contiguous to the space between said boxes having numerous perforations for the ingress of drying air from the interiors of said boxes into such spaces, one or more trucks adapted to be moved into and to stand within said tunnel and subsequently moved out of said tunnel, each of said trucks having a plurality of upright frames adapted to hold flat sided clay cakes positioned with their flat sides vertical and so spaced as to pass into and stand in the spaces between said boxes with the flat sides of said cakes juxtaposed to the perforated sides of said boxes, and means for supplying drying air to said chamber, whereby such clay cakes can be readily loaded onto said trucks, moved into said tunnel, dried rapidly and uniformly to proper moisture content and quickly removed from the apparatus.

2. The combination defined in claim 1 in which the means for supplying drying air includes a fan discharging into said chamber, and which combination includes a conduit for returning air from said tunnel to said fan.

References Cited in the file of this patent

UNITED STATES PATENTS

| | | |
|---|---|---|
| 1,099,276 | Bauer | June 9, 1914 |
| 1,183,097 | Merrill | May 16, 1916 |
| 1,461,393 | Jenkinson | July 10, 1923 |
| 1,963,356 | Davis | June 19, 1934 |
| 2,050,226 | Krick | Aug. 4, 1936 |
| 2,112,827 | Eickhoff et al. | Apr. 5, 1938 |
| 2,347,109 | Hurxthal | Apr. 18, 1944 |
| 2,385,962 | Barnett | Oct. 2, 1945 |
| 2,396,079 | Bowen | Mar. 5, 1946 |
| 2,547,833 | Parkes et al. | Apr. 3, 1951 |